United States Patent
De Bossoreille

(10) Patent No.: US 9,446,683 B2
(45) Date of Patent: Sep. 20, 2016

(54) SYSTEM AND METHOD FOR CONTROLLING THE TORQUE OF A TRACTION MOTOR OF A MOTOR VEHICLE AS A FUNCTION OF THE ROTATION SPEED AND THE DEPRESSION OF THE ACCELERATOR PEDAL

(71) Applicant: RENAULT s.a.s., Boulogne-Billancourt (FR)

(72) Inventor: Antoine De Bossoreille, Longpont-sur-Orge (FR)

(73) Assignee: RENAULT s.a.s., Boulogne-Billancourt (FR)

(*) Notice: Subject to any disclaimer, the term of this patent is extended or adjusted under 35 U.S.C. 154(b) by 0 days.

(21) Appl. No.: 14/417,000

(22) PCT Filed: Jun. 6, 2013

(86) PCT No.: PCT/FR2013/051284
§ 371 (c)(1),
(2) Date: Jan. 23, 2015

(87) PCT Pub. No.: WO2014/016482
PCT Pub. Date: Jan. 30, 2014

(65) Prior Publication Data
US 2015/0202988 A1  Jul. 23, 2015

(30) Foreign Application Priority Data
Jul. 25, 2012 (FR) .................................... 12 57209

(51) Int. Cl.
*B60L 9/00* (2006.01)
*B60L 15/20* (2006.01)
(Continued)

(52) U.S. Cl.
CPC ................ *B60L 15/20* (2013.01); *B60L 11/12* (2013.01); *B60L 11/14* (2013.01); *B60W 10/08* (2013.01);
(Continued)

(58) Field of Classification Search
USPC ........................................................... 701/22
See application file for complete search history.

(56) References Cited

U.S. PATENT DOCUMENTS 5,631,796 A     5/1997  Yoshihara et al.
8,224,544 B2 *  7/2012  Sah ................. B60W 30/18027
                                                  180/65.21

(Continued)

FOREIGN PATENT DOCUMENTS

| DE | 43 31 691 | 3/1994 |
| EP | 2 426 022 | 3/2012 |
| FR | 2 720 699 | 12/1995 |

OTHER PUBLICATIONS

Machine Translation of EP 2426022 (Bosch, Richter et al.)*

(Continued)

*Primary Examiner* — Hussein A. Elchanti
(74) *Attorney, Agent, or Firm* — Oblon, McClelland, Maier & Neustadt, L.L.P.

(57) ABSTRACT

A system and method for controlling torque of an engine of a motor vehicle based on rotational velocity and depression of an acceleration pedal. The system for controlling torque of an engine helps to propel a motor vehicle and includes: sensors configured to measure a rotational velocity and depression of an acceleration pedal, a mechanism for determining a torque setpoint capable of determining a torque setpoint that increases with the rotational velocity and starts with a reference torque for a reference rotational velocity, and the mechanism for determining being connected to an output of the electric engine.

12 Claims, 4 Drawing Sheets

(51) Int. Cl.
*B60L 11/12* (2006.01)
*B60L 11/14* (2006.01)
*B60W 10/08* (2006.01)

(52) U.S. Cl.
CPC ..... *B60L 2240/421* (2013.01); *B60L 2240/423* (2013.01); *B60L 2250/26* (2013.01); *B60L 2250/28* (2013.01); *Y02T 10/645* (2013.01); *Y02T 10/7077* (2013.01); *Y02T 10/72* (2013.01); *Y02T 10/7275* (2013.01)

(56) References Cited

U.S. PATENT DOCUMENTS

| | | | | |
|---|---|---|---|---|
| 8,290,681 | B2 * | 10/2012 | Kaminsky | B60K 6/445 180/65.21 |
| 8,296,032 | B2 * | 10/2012 | Wang | B60K 6/445 701/51 |
| 8,392,058 | B2 * | 3/2013 | Kitchener | G05B 23/027 701/32.1 |
| 2009/0048064 | A1 | 2/2009 | Tanaka et al. | |
| 2009/0118914 | A1 * | 5/2009 | Schwenke | B60K 6/445 701/51 |
| 2009/0118925 | A1 * | 5/2009 | Hsieh | B60K 6/365 701/54 |
| 2009/0118999 | A1 * | 5/2009 | Heap | B60K 6/365 701/123 |
| 2009/0144002 | A1 * | 6/2009 | Zettel | G01R 35/00 702/64 |

OTHER PUBLICATIONS

Search Report Issued Apr. 8, 2013 in French Application No. 1257209 Filed Jul. 25, 2012.

International Search Report Issued Jan. 8, 2014 in PCT/FR13/051284 Filed Jun. 6, 2013.

* cited by examiner

SYSTEM AND METHOD FOR CONTROLLING THE TORQUE OF A TRACTION MOTOR OF A MOTOR VEHICLE AS A FUNCTION OF THE ROTATION SPEED AND THE DEPRESSION OF THE ACCELERATOR PEDAL

BACKGROUND

The technical field of the invention is controlling motors for propelling motor vehicles, grouping together all motor technologies and more particularly controlling the torque as a function of the rotation speed of electric motors.

An electric motor generally has a high torque at a low rotation speed after which the torque decreases as the rotation speed increases.

In contrast, an internal combustion engine has a maximum torque at intermediate rotation speeds. This maximum torque decreases as soon as a change occurs toward rotation speeds higher or lower than this intermediate rotation speed.

If the driver of an electric vehicle requests a high level of acceleration corresponding to a depression of the accelerator pedal exceeding 50%, they experience a feeling of running out of steam as the speed increases. Because of the torque curve of the electric motor and the single-ratio gearbox, the acceleration of the vehicle drops sharply as the speed of the vehicle increases. This causes a feeling contrary to the experience of most drivers that is proving prejudicial to the adoption of electric vehicles.

In comparison, internal combustion engine vehicles have an acceleration that drops less sharply or even increases as the rotation speed increases in a given gear.

The problem is linked to the shape of the torque and power curves of electric machines compared to those of internal combustion engines. This problem has not been solved because it is at present considered that this forms part of the characteristics of an electric vehicle.

SUMMARY

There exists a requirement for a system and a method of controlling an electric vehicle making it possible to obtain for the traction motor curves of torque as a function of rotation speed different from those generally obtained in the prior art.

The invention concerns a system for controlling the torque of a motor participating in the propulsion of a motor vehicle, including:
sensors adapted to measure the rotation speed of the electric motor and the depression of the accelerator pedal, and
means for determining a torque setpoint adapted to determine a torque setpoint increasing with the rotation speed and starting from a reference torque for a reference rotation speed, the output of the determination means being connected to the electric motor.

The system may include a map of a torque setpoint as a function of the rotation speed of the electric motor and the depression of the accelerator pedal, comparator means adapted to output a control signal when the maximum torque obtained from the map for the measured rotation speed is decreasing, storage means adapted, on receiving the control signal from the comparator means, to store the measured rotation speed as the reference rotation speed and to store the setpoint torque at that time, and a subtractor adapted to subtract a predetermined offset value from the stored torque in order to obtain the reference torque.

The determination means may be connected to means for comparing the torque setpoint that has been determined to a maximum value of the motor torque obtained from the map, the output of the comparator means being connected to storage means adapted, on receiving a signal from the comparator means, to store the rotation speed as the reference rotation speed and to store the torque, the storage means being interconnected with the subtractor adapted to subtract a predetermined offset value from the stored torque in order to obtain the reference torque,
the output of the subtractor being moreover connected to the determination means.

The system may include a map of a torque setpoint as a function of the rotation speed of the electric motor and the depression of the accelerator pedal the output of which is connected to means for comparing the degree of depression of the accelerator pedal to a threshold value for the depression of the accelerator pedal, the output of the comparator means being connected to storage means adapted to store the value of the applied torque when depression of the pedal is detected, the storage means being also adapted to store the reference rotation speed corresponding to the rotation speed of the motor when depression of the pedal is detected, means for comparing the degree of depression of the accelerator pedal to a threshold value for the depression of the accelerator pedal adapted to detect maintaining of the request for high acceleration, the output of the comparator means for the degree of depression of the accelerator pedal being connected to control means adapted to reset the torque setpoint if the request for high acceleration is not maintained and to the determination means if the request for high acceleration is maintained.

The determination means may be connected to means for comparing the torque setpoint to a maximum value of the motor torque, the output of the comparator means being connected to storage means adapted, on receiving a signal from the comparator means, to store the rotation speed as the reference rotation speed and to store the torque, the storage means being interconnected with a subtractor adapted to subtract a predetermined offset value from the stored torque in order to obtain the reference torque, the output of the subtractor being connected to the comparator means.

The invention also concerns a method of controlling the torque of an electric motor as a function of the rotation speed and the depression of the accelerator pedal, including the following steps:
storing the initial conditions of the system at the time of depression of the accelerator pedal,
initializing a torque setpoint as a function of these initial conditions, and
generating a torque setpoint by successive evolutions from the initial torque setpoint, taking into account the history of the torque setpoints.

An initial torque setpoint less than the maximum torque that the system is capable of delivering may be determined.

A torque setpoint increasing with the rotation speed may be determined.

The torque setpoint may be limited to the maximum torque that the system is capable of delivering.

If the torque setpoint reaches the maximum torque for a rotation speed a new torque setpoint less than the maximum torque that the system is capable of delivering whilst maintaining the same rotation speed may be determined, and the determination of the torque setpoint then resumes from the new torque setpoint.

The method may be initialized by determining a torque setpoint as a function of the rotation speed of the electric motor and the depression of the accelerator pedal using a map of a torque setpoint as a function of the rotation speed of the electric motor and the depression of the accelerator pedal, after which the torque and the rotation speed may be stored, as soon as the maximum torque is decreasing.

Whether the torque setpoint that has been determined is greater than a maximum value of the motor torque obtained from a map of a torque setpoint as a function of the rotation speed of the electric motor and the depression of the accelerator pedal may be determined; if so, the rotation speed is stored as the reference rotation speed and the difference between the torque setpoint and a predetermined offset value is stored as the reference torque before a new torque setpoint is determined.

The method may be initialized by determining a torque setpoint as a function of the rotation speed of the electric motor and the depression of the accelerator pedal using a map of a torque setpoint as a function of the rotation speed of the electric motor and the depression of the accelerator pedal, the degree of depression of the accelerator pedal is compared to a threshold value for the depression of the accelerator pedal, if the degree of depression of the accelerator pedal is greater than the threshold value for the depression of the accelerator pedal, the rotation speed is stored as the reference rotation speed and the difference between the torque setpoint and a predetermined offset value is stored as the reference torque, the degree of depression of the accelerator pedal is again compared to the threshold value for the depression of the accelerator pedal, if the degree of depression of the accelerator pedal is less than the threshold value for the depression of the accelerator pedal, the torque request is reset, if not, the method continues by determining a torque setpoint as a function of the reference rotation speed and torque setpoint.

A torque setpoint may be maintained that is equal to the maximum value of the motor torque if the torque setpoint that has been determined is greater than the maximum value of the motor torque.

BRIEF DESCRIPTION OF THE DRAWINGS

Other objects, features and advantages of the invention will become apparent on reading the following description given by way of nonlimiting example only and with reference to the appended drawings, in which.

DETAILED DESCRIPTION

Figure 1:
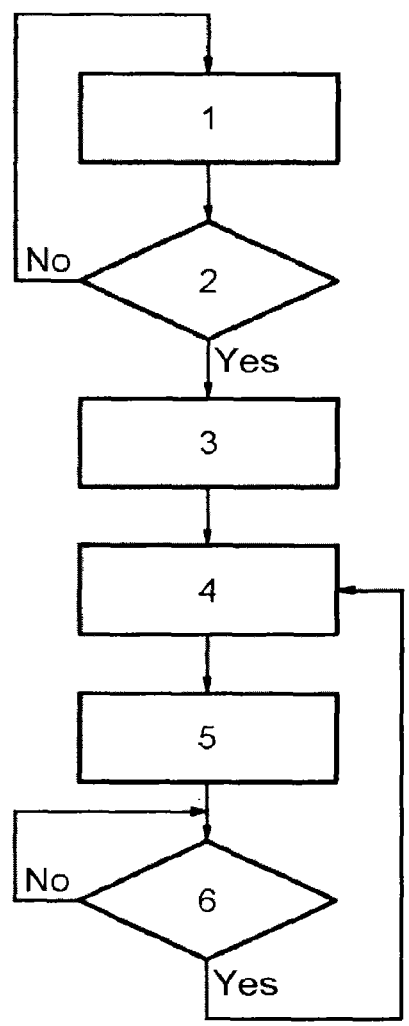
FIG. 1 shows the main steps of a method in accordance with one embodiment of controlling an electric motor.

The control system and method enable provision of a reserve of torque for higher rotation speeds by reducing the performance of the electric motor, which leaves scope for increasing this performance over time or with the increase of the rotation speed.

It is possible to generalize the control system and method to any motorized vehicle for which the sensation of acceleration experienced occupies an important place in the experience of the user. Because they are operative in the high layers of the generation of the torque setpoint, they may be applied to all motor technologies (for example internal combustion engine, electric, hybrid) associated with a gearbox, independently of the number of ratios and the technology of the latter gearbox.

In a first embodiment, the control system and method enable an acceleration of the vehicle under full load to be achieved that resembles the acceleration of an internal combustion engine vehicle. To this end, the aim is to control the torque curve generated by the propulsion unit as a function of the intrinsic torque curve of the motor.

The maximum torque curve obtained by calibration is modified to change from a curve decreasing in a linear manner to a set of segments each growing over a limited range of rotation speeds. This therefore emulates the behavior of a propulsion unit with an internal combustion engine and gearbox.

However, to remain within the ratings envelope of the electric motor, it is necessary to reduce the torque on reaching the maximum capabilities of the electric motor. Each increasing acceleration segment is therefore followed by a rapid reduction of the torque. The rotation speed of the electric motor continues to increase, however. This rapid reduction of the torque may be regarded as similar to changing gear in a propulsion unit with an internal combustion engine.

This solution is easily implemented in the motor controls of present-day electric vehicles but suffers from disadvantages under some conditions of use.

For example, the experience of the driver is a negative experience if the rapid reduction of the torque between two segments occurs at the same time as or just after depressing the accelerator pedal, because their request for greater acceleration expressed by depressing the accelerator pedal will be reflected in a reduction of the acceleration of the vehicle.

The method of controlling the electric motor begins with a step 1 during which a torque setpoint is determined equal to the maximum torque Cmax(N) as a function of the rotation speed of the electric motor and the depression of the accelerator pedal using a nominal map (8).

During a second step 2, it is determined if the maximum torque Cmax(N) obtained from the nominal map is decreasing.

As soon as the maximum torque Cmax(N) is decreasing, at a given depression of the pedal, the torque is stored in a value Cdec and the rotation speed is stored in a value Ndec. This occurs in a step 3 of the method.

Alternatively, the values Cdec and Ndec are mapped.

During a fourth step 4, a predetermined offset value Cdim is subtracted from the torque Cdec. Alternatively, the offset value Cdim may be obtained from a map depending on the depression of the accelerator pedal and the rotation speed N.

The value Cdec-Cdim is stored in a reference torque C0 and the value Ndec is stored in a reference rotation speed N0. A point is therefore obtained with coordinates (C0, N0).

During a fifth step 5, a torque setpoint denoted Torque(N) increasing with the rotation speed N and starting from the reference torque C0 for the reference rotation speed N0 is determined. The torque setpoint can be obtained either from a map as a function of the initial engine speed and the current engine speed, on exit from which C0 is added, or by calculation, for example by applying the following equation:

$$\text{Torque}(N) = C0 + \text{SlopeCmot} \cdot (N - N0) \qquad \text{(Eq. 1)}$$

where:
N: the rotation speed of the motor,
N0: reference rotation speed,
C0: reference torque, and SlopeCmot: coefficient of increase of the setpoint torque Torque(N). This value, in Nm.min/rev, may be constant or obtained from a map as a function of the vehicle speed and the level of pedal depression.

The method continues in the step 6 by determining if the torque setpoint Torque(N) is greater than a maximum value Cmax(N) of the motor torque. The value Cmax(N) represents the curve of the maximum torque as a function of the rotation speed N corresponding to the nominal map for a 100% depression of the accelerator pedal.

If the torque setpoint Torque(N) is greater than the maximum value Cmax(N) of the motor torque, the instantaneous rotation speed is stored in the variable Ndec and the torque setpoint Cmax(Ndec) is stored in the variable Cdec. The method continues in the step 4.

Figure 2:
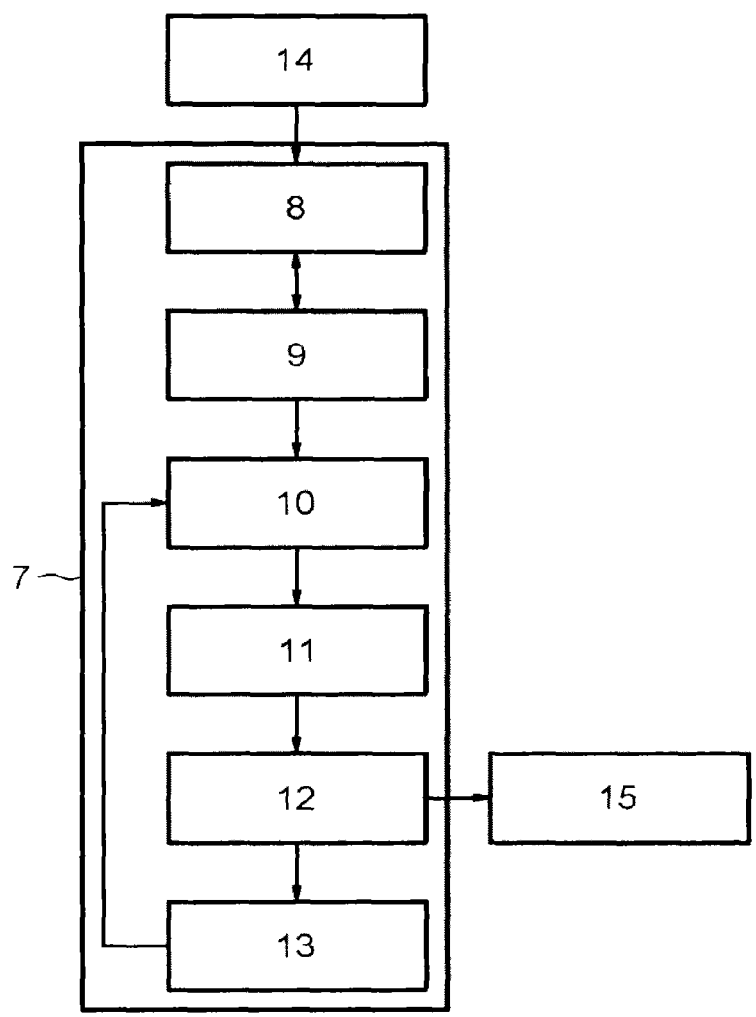
FIG. 2 shows the main elements of a system in accordance with one embodiment for controlling an electric motor.

Still in accordance with the first embodiment, the electric motor 15 is controlled by a control system shown in FIG. 2.

The control system 7 of an electric motor 15 includes means 8 for determining a torque setpoint as a function of the rotation speed of the electric motor and the depression of the accelerator pedal, such as a map. Sensors 14 are connected to the map 8 and to the other elements of the control system 7 requiring measurements. The sensors 14 are adapted to determine characteristic magnitudes of the operation of the vehicle such as the torque of the electric motor, the rotation speed of the electric motor and the degree of depression of the accelerator pedal.

The output of the map 8 is connected to comparator means 9 adapted to determine if the maximum torque obtained from the nominal map is decreasing.

The output of the comparator means 9 is connected to storage means 10 adapted to store the torque in a value Cdec and the rotation speed in a value Ndec as soon as the maximum torque is decreasing.

Alternatively, the comparator means 9 may be replaced by a map of the values Cdec and Ndec.

The output of the storage means 10 is connected to a subtractor 11 adapted to subtract a predetermined offset value Cdim from the torque Cdec. Alternatively, the storage means 10 may contain a map 10a of the offset value Cdim as a function of the depression of the accelerator pedal and the rotation speed N.

The output of the subtractor 11 is connected to storage means 11a adapted to store the value obtained from the subtractor in a reference torque CO and the value Ndec in a reference rotation speed NO.

The output of the storage means 11a is connected to means 12 for determining a torque setpoint adapted to determine a torque setpoint denoted Torque(N) increasing with the rotation speed N and starting from the reference torque CO for the reference rotation speed NO. The determination means 12 apply equation 1.

The output of the determination means 12 is connected to the electric motor 15 and to comparator means 13 adapted to determine if the torque setpoint Torque(N) is greater than a maximum value Cmax(N) of the motor torque. The value Cmax(N) represents the curve of the maximum torque as a function of the rotation speed N corresponding to the nominal map for a 100% depression of the accelerator pedal.

The output of the comparator means 13 is connected to the storage means 11a so that, if the torque setpoint Torque(N) is greater than the maximum value Cmax(N) of the motor torque, the instantaneous rotation speed is stored in the variable Ndec and the torque setpoint Cmax(Ndec) is stored in the variable Cdec.

In a second embodiment, the control system and method are adapted to take into account the time at which the driver strongly depresses the accelerator pedal. It is then possible to construct, at the given time, the torque setpoint that represents the best match for optimizing the acceleration of the vehicle at the same time as preserving the experience of the driver.

The control system and method make it possible to maintain the sensation of acceleration for a minimum time regardless of the rotation speed of the motor when the pedal is depressed.

Figure 3:
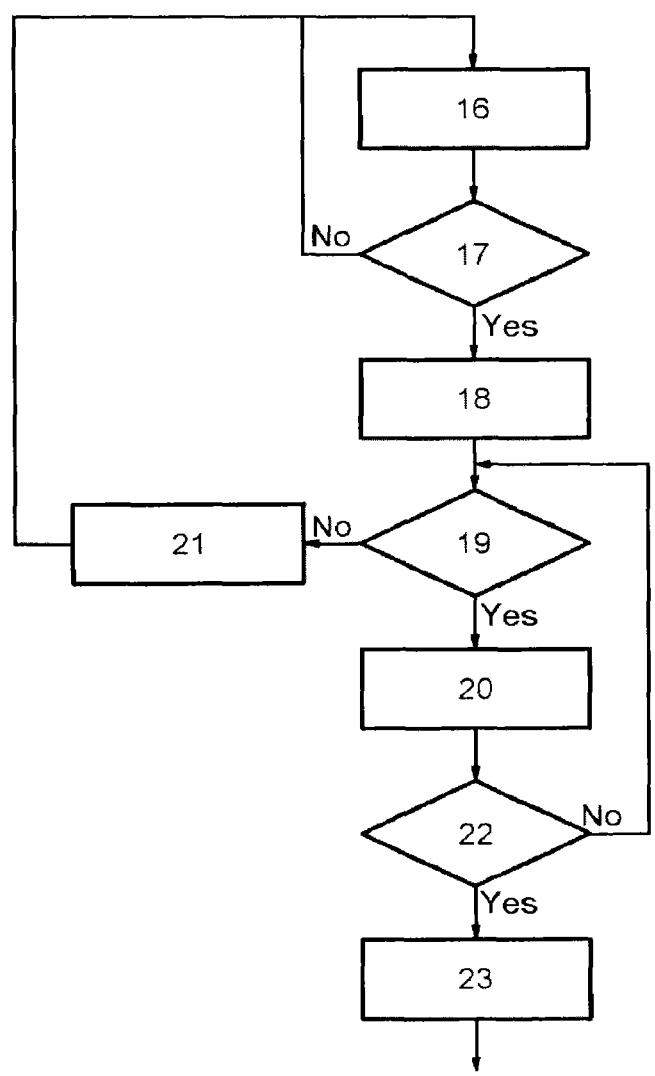
FIG. 3 shows the main steps of a method in accordance with another embodiment of controlling an electric motor.

So as not to multiply the number of maps, which represents costs both during development and when used onboard a vehicle, the control method applies the steps shown in FIG. 3.

During a first step 16, a torque setpoint is determined as a function of the depression of the accelerator pedal and the rotation speed of the motor. This step is similar to the step 1 of the first embodiment of the control method. It will be noted that the curve of the setpoint as a function of the rotation speed of the motor for a 100% depression of the accelerator pedal corresponds to the maximum torque curve of the propulsion unit.

This first step corresponds to the prior art as applied routinely in motor vehicles, grouping together all propulsion unit technologies.

The method continues in the step 17 that enables operation in accordance with the prior art to be circumvented if conditions of depression of the accelerator pedal are detected corresponding to a request for high acceleration. To this end, the degree of depression of the accelerator pedal is compared to a threshold value $S_{pedal}$ for the depression of the accelerator pedal. A second threshold may be defined in order to introduce hysteresis.

If the result of the comparison is positive, the method continues in the step 18; if not, it returns to the step 16.

In the step 18, an initial setpoint torque value Cinit corresponding to the torque value to be applied when depression of the pedal is detected is defined. The rotation speed Ninit corresponding to the rotation speed of the engine measured when depression of the pedal is detected is also defined. The value Cinit may be obtained from a map as a function of the vehicle speed and the level of pedal depression.

The method continues in the step 19, during which there are detected conditions of depression of the accelerator pedal corresponding to a maintained request for high acceleration. To this end, the degree of depression of the accelerator pedal is compared to a threshold value $S_{pedal}$ for the depression of the accelerator pedal.

A second threshold may be defined in order to introduce hysteresis.

If the result of the comparison is positive, the method continues in the step 20; if not, it returns to the step 21 during which the torque request is reset, the method then continuing in the step 16.

The step 20 is similar to the step 5 of the first embodiment of the control method. During the step 20, a setpoint torque value Torque(N) that increases with the rotation speed of the motor is defined by applying equation 1 defined above or using a value obtained from any other determination system based on maps and/or calculations.

The method continues in the step 22 during which whether the torque setpoint Torque(N) is greater than a maximum value Cmax(N) of the motor torque is determined. This step is similar to the step 6 of the first embodiment of the control method. The value Cmax(N) represents the curve of the maximum torque as a function of the rotation speed N and corresponding to the nominal map for a 100% depression of the accelerator pedal. If the torque setpoint Torque(N) is greater than a maximum value Cmax (N) of the motor torque, the method continues in the step 23; if not, it returns to the step 19.

In the step 23, an offset value Cdim is subtracted from the torque setpoint Torque(N). The offset value Cdim may be obtained from a map as a function of the vehicle speed and the level of pedal depression. This step is similar to the step 4 of the first embodiment of the control method.

Following the step 23, the method continues in the step 19.

In accordance with another embodiment, a step 22a may be substituted for the step 22, during which a torque setpoint Torque(N) equal to the maximum value Cmax(N) of the motor torque is maintained.

Operation therefore remains on the maximum torque curve without reducing the torque. The vehicle then exhibits nominal operation.

Figure 4:
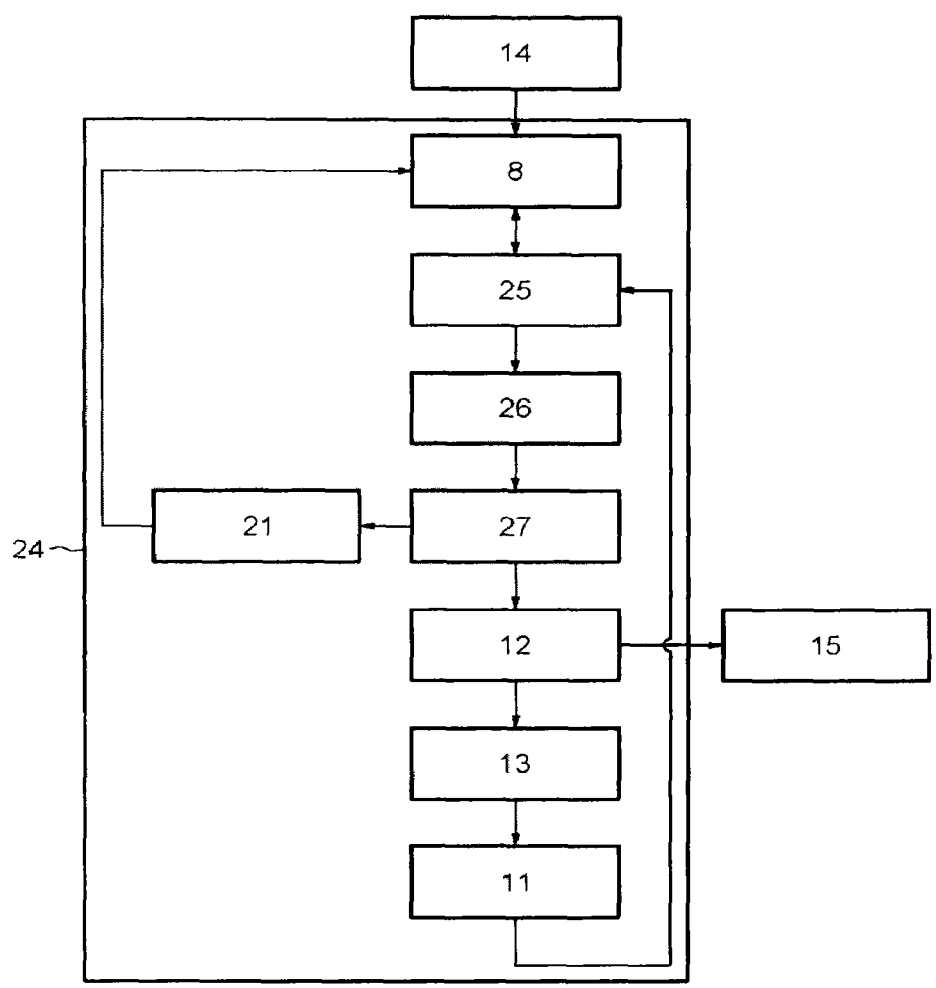
FIG. 4 shows the main elements of a system in accordance with another embodiment for controlling an electric motor.

FIG. 4 shows the control system in accordance with the second embodiment. Elements bearing the same references as elements of the control system in accordance with the first embodiment provide essentially the same functions.

The control system 24 includes a map 8 of a torque setpoint as a function of the depression of the accelerator pedal and the rotation speed of the motor.

Sensors 14 are connected to the map 8 and to the other elements of the control system 7 requiring measurements. The sensors 14 are adapted to determine characteristic magnitudes of the operation of the vehicle such as the torque of the electric motor, the rotation speed of the electric motor and the degree of depression of the accelerator pedal.

The output of the map 8 is connected to means 25 for comparing the degree of depression of the accelerator pedal to a threshold value $S_{pedal}$ for the depression of the accelerator pedal. Conditions of depression of the accelerator pedal corresponding to a request for high acceleration are therefore detected. A second threshold could be defined in order to introduce hysteresis.

The output of the comparator means 25 is connected to storage means 26 adapted to store an initial setpoint torque value Cinit corresponding to the torque value applied when depression of the pedal is detected. The storage means 26 are also adapted to store the rotation speed Ninit corresponding to the rotation speed of the motor when depression of the pedal is detected. Alternatively, the value Cinit may be obtained from a map as a function of the vehicle speed and the level of pedal depression.

The output of the storage means 26 is connected to means 27 for comparing the degree of depression of the accelerator pedal to a threshold value $S_{pedal}$ for the depression of the accelerator pedal. Conditions of depression of the accelerator pedal corresponding to a maintained request for high acceleration are therefore detected. A second threshold may be defined in order to introduce hysteresis.

The output of the comparator means 27 is connected to control means 28 adapted to reset the torque setpoint, itself having its output connected to the torque setpoint map 8.

The output of the comparator means 27 is also connected to means 12 for determining a torque value adapted to apply equation 1 defined above. The output of the determination means 12 is connected to the electric motor 15 and to means 13 for comparing the torque setpoint Torque(N) to a maximum value Cmax(N) of the motor torque.

The output of the comparator means 13 is connected to a subtractor 11 adapted to subtract a torque reduction value Cdim from the torque setpoint Torque(N). The offset value Cdim may be obtained from a map as a function of the vehicle speed and the level of pedal depression. The output of the subtractor 11 is connected to the comparator means 25.

The control method and system enable modification of the behavior of an electric motor in order for the driver to perceive operation similar to that of an internal combustion engine. It is therefore possible to combine the environmental qualities of an electric motor with the driving qualities of an internal combustion engine.

The invention claimed is:

1. A system for controlling torque of a motor participating in propulsion of a motor vehicle, comprising:
sensors configured to measure a rotation speed of the motor and a depression of an accelerator pedal; and
a controller configured to:
determine a torque setpoint increasing with the rotation speed and starting from a reference torque for a reference rotation speed, and
output the torque setpoint to the motor,
wherein the controller is further configured to
determine whether the determined torque setpoint is greater than a maximum value of the motor torque obtained from a map of the torque setpoint as a function of the rotation speed of the electric motor and the depression of the accelerator pedal, and
store, when the determined torque setpoint is greater than the maximum value of the motor torque, the rotation speed as the reference rotation speed and the difference between the torque setpoint and a predetermined offset value as the reference torque.

2. The system as claimed in claim 1, wherein the controller is configured to:
calculate the map of the torque setpoint as the function of the rotation speed of the electric motor and the depression of the accelerator pedal,
output a control signal when the maximum value of the motor torque obtained from the map for the rotation speed of the motor is decreasing;
store, on receiving the control signal, the rotation speed of the motor as the reference rotation speed and store the setpoint torque at that time; and
subtract the predetermined offset value from the stored torque to obtain the reference torque.

3. The system as claimed in claim 1, wherein the controller is configured to:
compare the degree of depression of the accelerator pedal to a threshold value for the depression of the accelerator pedal,
detect maintaining of a request for high acceleration, and
reset the torque setpoint when the request for high acceleration is not maintained.

4. A method of controlling torque of an electric motor as a function of a rotation speed and a depression of an accelerator pedal, comprising:
storing initial conditions of the system at a time of depression of the accelerator pedal;
initializing an initial torque setpoint as a function of the initial conditions;
generating a torque setpoint by successive evolutions from the initial torque setpoint, taking into account a history of torque setpoints, wherein the generating further comprises:
determining whether the torque setpoint is greater than a maximum value of the motor torque obtained from a map of the torque setpoint as the function of the rotation speed of the electric motor and the depression of the accelerator pedal, and storing, when the torque setpoint is greater than a maximum value of the motor torque, the rotation speed as the reference rotation speed and the difference between the torque setpoint and a predetermined offset value as the reference torque before a new torque setpoint.

5. The method as claimed in claim 4, further comprising determining the initial torque setpoint to be less than a maximum torque that the system is capable of delivering.

6. The method as claimed in claim 4, wherein the generating further comprises determining the torque setpoint increasing with the rotation speed.

7. The method as claimed in claim 4, wherein the torque setpoint is limited to a maximum torque that the system is capable of delivering.

8. The method as claimed in claim 4, wherein the generating further comprises
- determining, when the torque setpoint reaches the maximum value of the motor torque for a rotation speed, the new torque setpoint that is less than a maximum torque that the system is capable of delivering whilst maintaining a same rotation speed, and
- then resuming determination of the torque setpoint from the new torque setpoint.

9. The method as claimed in claim 4, wherein the method is initialized by determining the initial torque setpoint as the function of the rotation speed of the electric motor and the depression of the accelerator pedal using the map of the torque setpoint as the function of the rotation speed of the electric motor and the depression of the accelerator pedal, after which the torque and the rotation speed are stored, as soon as a maximum torque is decreasing.

10. The method as claimed in claim 4, wherein the method is initialized by determining the initial torque setpoint as the function of the rotation speed of the electric motor and the depression of the accelerator pedal using the map of the torque setpoint as the function of the rotation speed of the electric motor and the depression of the accelerator pedal,
- a degree of depression of the accelerator pedal is compared to a threshold value for the depression of the accelerator pedal,
- when the degree of depression of the accelerator pedal is greater than the threshold value for the depression of the accelerator pedal, the rotation speed is stored as the reference rotation speed and the difference between the torque setpoint and the predetermined offset value is stored as the reference torque,
- the degree of depression of the accelerator pedal is again compared to the threshold value for the depression of the accelerator pedal,
- when the degree of depression of the accelerator pedal is less than the threshold value for the depression of the accelerator pedal, the torque request is reset,
- when the degree of depression of the accelerator pedal is not less than the threshold value for the depression of the accelerator pedal, the method continues by determining the torque setpoint as the function of the reference rotation speed and torque setpoint.

11. The method as claimed in claim 4, wherein the torque setpoint is maintained equal to a maximum value of the motor torque when the torque setpoint that has been determined to be greater than a maximum value of the motor torque.

12. A device for controlling torque of an electric motor as a function of a rotation speed and a depression of an accelerator pedal, comprising:
- processing circuitry configured to
  - store initial conditions of the system at a time of depression of the accelerator pedal;
  - initialize an initial torque setpoint as a function of the initial conditions;
  - generate a torque setpoint by successive evolutions from the initial torque setpoint, taking into account a history of torque setpoints,
- wherein the processing circuitry is further configured to generate the torque setpoint by being further configured to
  - determine whether the torque setpoint is greater than a maximum value of the motor torque obtained from a map of the torque setpoint as the function of the rotation speed of the electric motor and the depression of the accelerator pedal, and
  - store, when the torque setpoint is greater than a maximum value of the motor torque, the rotation speed as the reference rotation speed and the difference between the torque setpoint and a predetermined offset value as the reference torque before a new torque setpoint.

* * * * *